US012638216B1

(12) United States Patent
Guo et al.

(10) Patent No.: US 12,638,216 B1
(45) Date of Patent: May 26, 2026

(54) METAL-DIELECTRIC THIN FILM STRUCTURE FOR SOLAR LIGHT ENERGY HARVESTING

(71) Applicants:Junpeng Guo, Madison, AL (US); Jinnan Chen, Beijing (CN)

(72) Inventors: Junpeng Guo, Madison, AL (US); Jinnan Chen, Beijing (CN)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 431 days.

(21) Appl. No.: 18/164,559

(22) Filed: Feb. 3, 2023

(51) Int. Cl.
| | |
|---|---|
| *F24S 70/60* | (2018.01) |
| *F24S 70/12* | (2018.01) |
| *F24S 70/16* | (2018.01) |
| *F24S 70/30* | (2018.01) |

(52) U.S. Cl.
CPC .............. *F24S 70/60* (2018.05); *F24S 70/12* (2018.05); *F24S 70/16* (2018.05); *F24S 70/30* (2018.05)

(58) Field of Classification Search
CPC .. F24S 70/60; F24S 70/30; F24S 70/12; F24S 70/16
See application file for complete search history.

(56) References Cited

U.S. PATENT DOCUMENTS

| | | | | |
|---|---|---|---|---|
| 9,660,117 B1 * | 5/2017 | Dimmock | ........... | H10F 77/1437 |
| 10,162,091 B1 | 12/2018 | Guo et al. | | |
| 10,353,124 B1 | 7/2019 | Guo | | |
| 11,569,777 B2 * | 1/2023 | Lenert | .................. | H10F 77/311 |
| 2018/0097136 A1 | 4/2018 | Retti | | |
| 2024/0038911 A1 * | 2/2024 | Bergmann | ............ | H10F 77/227 |

OTHER PUBLICATIONS

Chen, et al., "Metal-Dielectric Thin Film Structure Metamaterial for Obtaining High Equilibrium Temperature Under Direct Solar Optical Radiation," IEEE Photonics Journal, Apr. 2022, pp. 1-5, vol. 14, No. 2.
Zhou, et al., Nano-Cr-film-based solar selective absorber with high-photo-thermal conversion efficiency and good thermal stability, Optics Express, Dec. 17, 2012, pp. 2853-28962, vol. 20, No. 27.
Li, et al., "High solar absorption of a multilayerd thin film structure," Optics Express, Feb. 19, 2007, pp. 1907-1912, vol. 15, No. 4.

(Continued)

*Primary Examiner* — Alfred Basichas
(74) *Attorney, Agent, or Firm* — Butler Snow LLP; Jon E. Holland

(57) ABSTRACT

A nanostructure is provided for converting solar energy into thermal energy. The nanostructure can include a metal layer and an anti-reflective layer on the metal layer. The anti-reflective layer is positioned such that sunlight passes through the anti-reflective layer and absorbed by the metal layer, thereby resulting in an equilibrium temperature for the dielectric and metal layer system above 400 Kelvin (K). The metal layer can have a thickness of at least 100 nanometers (nm) to prohibit light transmission through the layer and the anti-reflective layer can be composed of a dielectric material and can have a thickness between 20 nm and 200 nm.

17 Claims, 8 Drawing Sheets

(56) References Cited

OTHER PUBLICATIONS

Chen, et al., Super-wideband perfect solar light absorbers using titanium and silicon dioxide thin-film cascade optical nanocavities, Optical Materials Express, Dec. 1, 2016, pp. 3804-3813, vol. 6, No. 12.

Granier, et al., "Optimized aperiodic broadband visible absorbers," Journal of Optics, pp. 1-7, 2017.

Shen, et al., Perfect mid-infrared dual-band optical absorption realzied by a simpled lithography-free polar dielectric/metal double-layer nanostructure, Oct. 12, 2020, pp. 31414-31424, vol. 28, No. 21.

Lenert, et al., A Nanophotonic Solar Thermophotovoltaic Device, Nature Nanotechnology, 2014, pp. 1-15, vol. 9, No. 2.

Li, et al., "Nanophotonic control of thermal radiation for energy applications," Optics Express, Jun. 11, 2018, pp. 15995-16021, vol. 26, No. 12.

Liu, et al., "Near-Field Thermal Radiation: Recent Progress and Outlook," Nanoscale and Microscale Thermophysical Engineering, Jun. 8, 2015, pp. 98-126.

Inoue, et al., "Realization of narrowband thermal emission with optical nanostructures," Optica, Jan. 2015, pp. 27-35, vol. 2, No. 1.

* cited by examiner

METAL-DIELECTRIC THIN FILM STRUCTURE FOR SOLAR LIGHT ENERGY HARVESTING

BACKGROUND

The present application generally relates to a metal-dielectric thin film structure that can obtain a high equilibrium temperature under direct solar optical radiation.

Solar light absorbers can be used in solar thermal energy harvesting systems. Ideally, solar light absorbers can be desired to have unit absorptance over the wideband solar light spectrum and zero thermal emission in the long-wavelength infrared spectral region. Metal-dielectric multilayer thin film structures can be used for the wide spectral band solar light absorption because of the low cost, lithography-free fabrication of the structures. However, when using metal-dielectric multilayer thin film structures, it can be difficult to completely suppress thermal emission in the long wavelength infrared region. For solar thermal energy harvesting systems, the temperature of a solar light absorber affects the efficiency of the system. Thus, it would be desirable to have a multilayer thin film structure that can produce a high equilibrium temperature under direct solar optical (or light) radiation.

SUMMARY

The present application generally pertains to metal-dielectric thin film structure metamaterials that can be designed to absorb solar light (or optical) radiation over a wide spectral band (e.g., a band that can include ultraviolet light, visible light and infrared light) and provide a high thermal equilibrium temperature as part of a solar light energy harvesting system. The thermal equilibrium temperatures for several metal-dielectric thin film structure metamaterials under direct solar light radiation at normal incidence have been evaluated using Kirchhoff's law and the law of energy conservation. The metal-dielectric thin film structure that produced the highest thermal equilibrium temperature is a dielectric layer on metal (DLM) surface structure.

The present application is also directed to a nanostructure for converting solar energy into thermal energy. The nanostructure can include a first metal layer and an anti-reflective layer (or coating) formed on the first metal layer and positioned such that sunlight passes through the anti-reflective coating and is absorbed by the first metal layer, thereby increasing the temperature of the first metal layer above 400 Kelvin (K). The first metal layer can have a thickness of at least 100 nanometers (nm) and the anti-reflective coating can be composed of a dielectric material and can have a thickness less than 100 nm. In some configurations of the nanostructure, the thickness of the anti-reflective coating can be between 20 nm and 80 nm.

One configuration of the nanostructure can include a first metal layer composed of tungsten and the anti-reflective coating having a thickness greater than 50 nm. Another configuration of the nanostructure can include the first metal layer composed of gold and the anti-reflective coating having a thickness between 25 nm and 75 nm. A further configuration of the nanostructure can include the first metal layer composed of chromium and the anti-reflective coating having a thickness greater than 40 nm. In addition, the nanostructure may include one or more bilayers between the anti-reflective coating and the first metal layer. Each bilayer can include a second metal layer formed on a dielectric layer.

An advantage of the present application is the conversion of solar energy to thermal energy, which is more efficient than the conversion of solar energy to electrical energy.

Another advantage of the present application is the ability to predict equilibrium temperatures of other material systems for solar energy harvesting and radiative cooling applications.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1A:
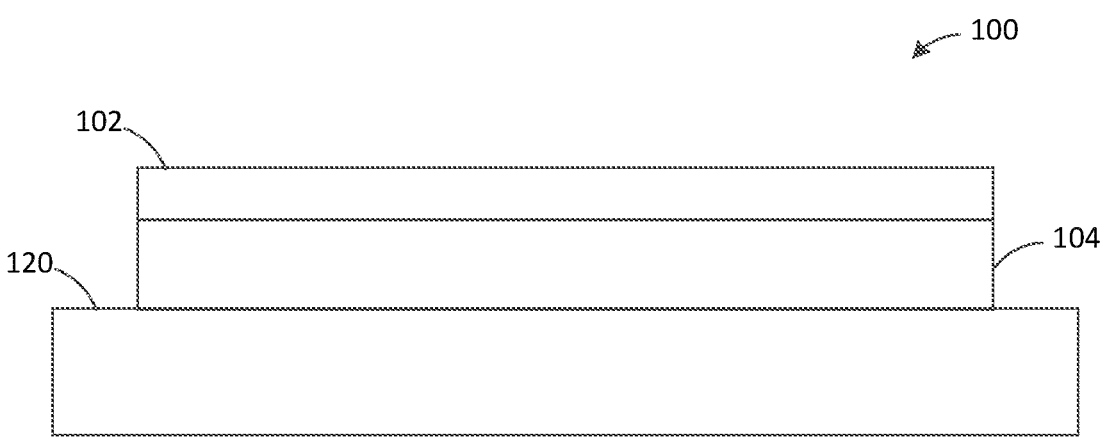
FIGS. 1A-1C are schematic diagrams of embodiments of a metal-dielectric thin film structure.
Figure 1B:
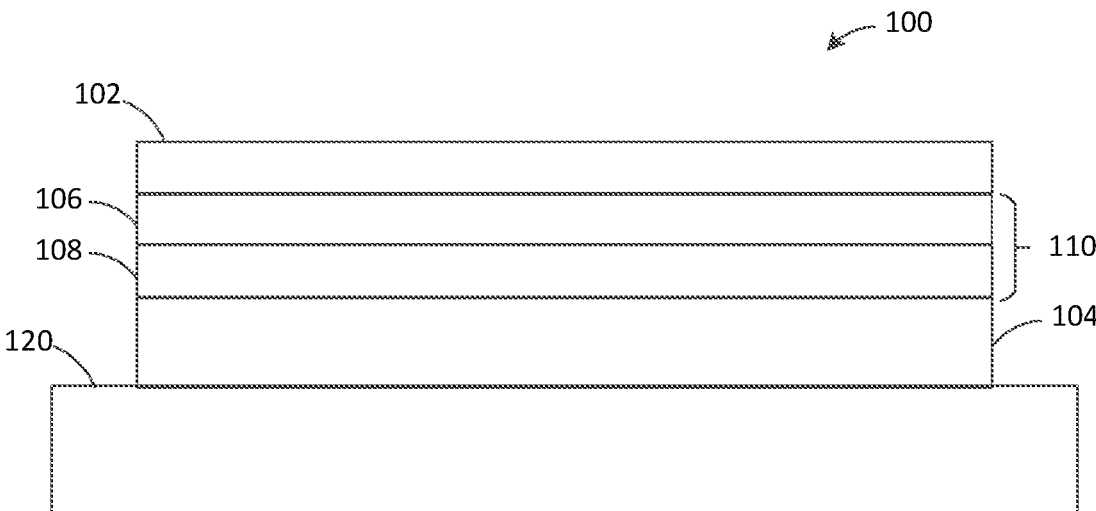
Figure 1C:
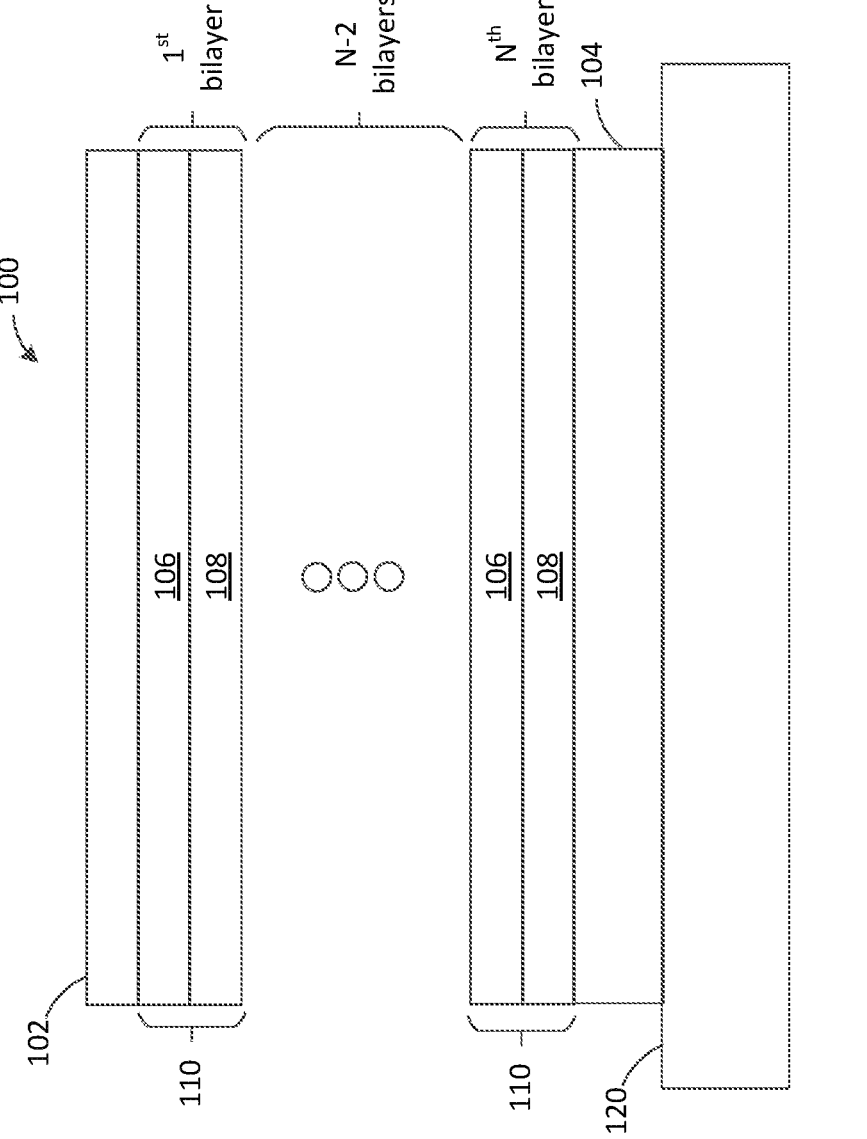

FIGS. 1A-1C shows embodiments of the metal-dielectric thin film metamaterial structure. In the embodiment of FIG. 1A, the metal-dielectric thin film metamaterial structure or nanostructure 100 can include an anti-reflective (AR) layer (or film) 102 positioned on (or formed on) an opaque or optically thick base metal layer (or film) 104 that is positioned on a substrate 120. The anti-reflective layer 102 is used to reduce the optical reflection, increase absorption and simultaneously protect the surface of the nanostructure 100. The anti-reflective layer 102 can be formed from a dielectric material such as aluminum oxide ($Al_2O_3$) in one embodiment. However, in other embodiments, any suitable dielectric material (e.g., silicon dioxide ($SiO_2$), yttrium oxide ($Y_2O_3$) or magnesium fluoride ($MgF_2$)) can be used for the anti-reflective layer 102. The anti-reflective layer 102 can have a thickness between about 20 nm and about 200 nm. The base metal layer 104 can be used to absorb solar radiation over a wide spectral band (e.g., a band that can include ultraviolet light, visible light and infrared light) and can be any suitable metal such as tungsten (W), gold (Au), silver (Ag), copper (Cu), aluminum (Al), or chromium (Cr) or a suitable metal alloy. In an embodiment, the base metal layer 104 can have a thickness of about 200 nm. However, in other embodiments, the base metal layer 104 can have any suitable thickness that will prevent light from reaching the substrate 120 (e.g., a thickness between about 100 nm and about 300 nm or more). In one embodiment, the choice of material for the substrate does not affect optical property of the nanostructure 100 since no light can get to the substrate 120. In other words, any suitable material can be used for the substrate 120.

In the embodiments of FIGS. 1B and 1C, the nanostructure 100 can also include one or more (N) bilayers 110 (or unit cells) positioned between the anti-reflective (AR) layer 102 and the base metal layer 104. Each bilayer 110 can include a metal layer 106 positioned on (or formed on) a dielectric layer 108. The metal layer 106 can have a thickness that is between about 2 nm and about 15 nm and the dielectric layer 108 can have a thickness that is between about 30 nm and 70 nm. The metal layer 106 can be any suitable metal such as tungsten (W), gold (Au), silver (Ag), copper (Cu), aluminum (Al), or chromium (Cr) or a suitable metal alloy. In one embodiment, the metal layer 106 can be composed of the same metal used in the base metal layer 104. However, in other embodiments, different metals may be used for the metal layer 106 and the base metal layer 104. In still further embodiments, different metals may be used for the metal layers 106 when more than one bilayer 110 is used in the nanostructure 100. The dielectric layer 108 can be formed from any suitable dielectric material such as aluminum oxide ($Al_2O_3$), silicon dioxide ($SiO_2$), yttrium oxide ($Y_2O_3$) or magnesium fluoride ($MgF_2$). In one embodiment, the dielectric layer 108 can be composed of the same as the dielectric material used in the anti-reflective layer 102. However, in other embodiments, different dielectric materials may be used for the anti-reflective layer 102 and the dielectric layers 108. In still further embodiments, different dielectric materials may be used for the dielectric layers 108 when more than one bilayer 110 is used in the nanostructure 100. In an embodiment, the bilayer 110 can have a metal layer 106 that can be tungsten and have a thickness of about 5-10 nm and a dielectric layer 108 that can be aluminum oxide and have a thickness of about 50 nm. The layers (or coatings) of the nanostructure 100 can be applied by any suitable manufacturing technique or process such as deposition processes.

To find the equilibrium temperature of the nanostructure 100 under direct solar optical radiation, the thermal emissivity of the nanostructure surface in all radiation directions has to be determined. According to Kirchhoff's thermal radiation law, emissivity of a surface in a given direction equals the optical absorptance (i.e., the ratio of the absorbed to the incident radiant power) in the same direction. Therefore, the optical absorptance $A(\theta, \lambda)$ in all radiation directions and at all wavelengths has to be calculated. Optical absorptance $A(\theta,\lambda)$ of the nanostructure 100 can be calculated by using the transfer matrix method in an embodiment. The transfer matrix for the nanostructure 100 can be obtained from dynamical matrixes and the propagation matrixes of each layer of the nanostructure 100. For TE (transverse electric) polarization light (i.e., light characterized by its electric field being perpendicular to the plane of incidence), the dynamical matrix $D_{si}$ of the medium i is provided by equation 1.

$$D_{si} = \begin{bmatrix} 1 & 1 \\ n_i\cos\theta_i & -n_i\cos\theta_i \end{bmatrix}$$ (1)

4 where $\theta_i$ is the angle of incidence in the medium i, $n_i$ is the refractive index of the i-th medium, and i=1, 2, 3, . . . . N. For TM (transverse magnetic) polarization light (i.e., light characterized by its magnetic field being perpendicular to the plane of incidence), the dynamical matrix $D_{pi}$ of medium i is provided by equation 2.

$$D_{pi} = \begin{bmatrix} n_i\cos\theta_i & n_i\cos\theta_i \\ 1 & -1 \end{bmatrix}$$ (2)

where $\theta_i$ is the angle of incidence in the medium i, $n_i$ is the refractive index of medium i, and i=1, 2, 3, . . . . N.

The propagation matrix Pi regardless of polarizations in the medium i is provided by equation 3.

$$P_i = \begin{bmatrix} e^{j\frac{2\pi n_i d_i}{\lambda}} & 0 \\ 0 & e^{-j\frac{2\pi n_i d_i}{\lambda}} \end{bmatrix}$$ (3)

where $n_i$ is the refractive index and di is the layer thickness of the medium i, $\lambda$ is the free space wavelength, j is the imaginary number, and i=1, 2, 3, . . . . N.

The transfer matrix of the nanostructure 100 is provided by equations 4 and 5.

$$M = D_0^{-1}D_{AR}P_{AR}D_{AR}^{-1}\left[D_mP_mD_m^{-1}D_dP_dD_d^{-1}\right]^N D_s$$ (4)

$$M = \begin{bmatrix} M_{11} & M_{12} \\ M_{21} & M_{22} \end{bmatrix}$$ (5)

In equations 4 and 5, $D_0$, is the dynamical matrix of the incident medium (air), $D_{AR}$ is the dynamical matrix of the anti-reflective layer 102, $D_m$ is the dynamical matrix of the metal layer 106 (if a bilayer 110 is present in the nanostructure 100), $D_d$ is the dynamical matrix of the dielectric layer 108 (if a bilayer 110 is present in the nanostructure 100), and $D_s$ is the dynamical matrix of the base metal layer 104. $P_{AR}$, $P_m$, and $P_d$ are propagation matrices of the anti-reflection layer 102, metal layer 106 (if a bilayer 110 is present in the nanostructure 100), and dielectric layer 108 (if a bilayer 110 is present in the nanostructure 100), respectively. The optical reflectance R from the nanostructure 100 can be obtained from the elements of the transfer matrix of M (as defined in equation 5) as provided for in equation 6.

$$R = \left|\frac{M_{21}}{M_{11}}\right|^2$$ (6)

The transmittance through the nanostructure 100 is zero because the base metal layer 104 prohibits light transmission. Therefore, optical absorptance (A) can be calculated by using the law of energy conservation, i.e., A=1−R. Since solar optical radiation has unpolarized light, the optical absorptance at wavelength $\lambda$ and angle of incidence $\theta$, is the average of the absorptance of TE polarization light $A_{TE}(\theta, \lambda)$ and absorptance of TM polarization light $A_{TM}(\theta, \lambda)$ as provided for in equation 7.

$$A(\theta, \lambda) = \frac{1}{2}[A_{TE}(\theta, \lambda) + A_{TM}(\theta, \lambda)]$$ (7)

5 where $A(\theta, \lambda)$ is the angular and wavelength dependent optical absorptance for unpolarized solar optical radiation in the nanostructure 100.

Using the previously described transfer matrix method, the optical absorptance of nanostructures 100 having different numbers of bilayers (e.g., N=0, 1, 2, 4, 6, and 8) at different wavelengths and different angles of incidence for TE and TM polarization lights can be calculated. From the calculated optical absorptance results, the surface thermal emissivity of the nanostructure 100 can be obtained by applying the Kirchhoff's thermal radiation law.

Kirchhoff's thermal radiation law states that the thermal emissivity of a surface in a specific direction equals the absorptance in that direction. Therefore, surface thermal emissivity $\varepsilon(\theta, \lambda)$ can be obtained from the calculated optical absorptance for unpolarized light as provided for in equation 8.

$$\varepsilon(\theta,\lambda)=A(\theta,\lambda) \tag{8}$$

Figure 2A:
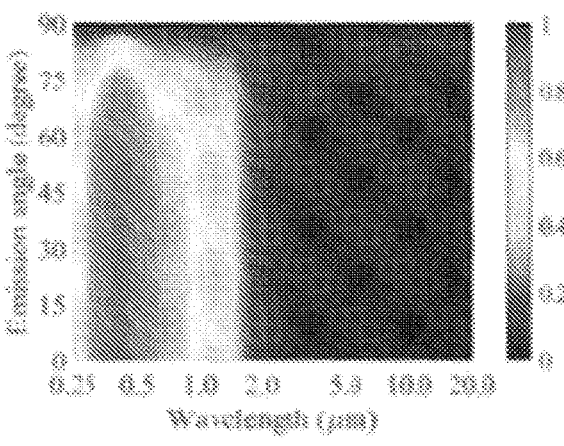
FIGS. 2A-2F are graphs showing thermal emissivity for different configurations of an embodiment of a metal-dielectric thin film structure.
Figure 2B:
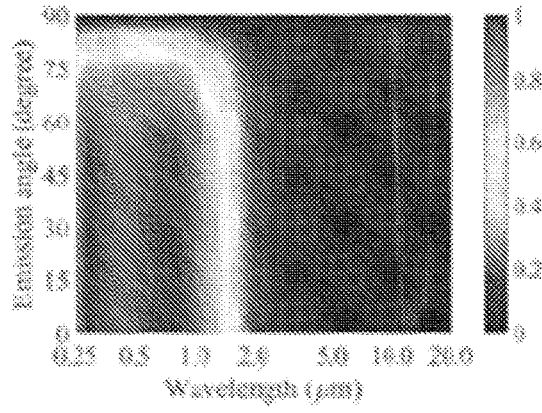
Figure 2C:
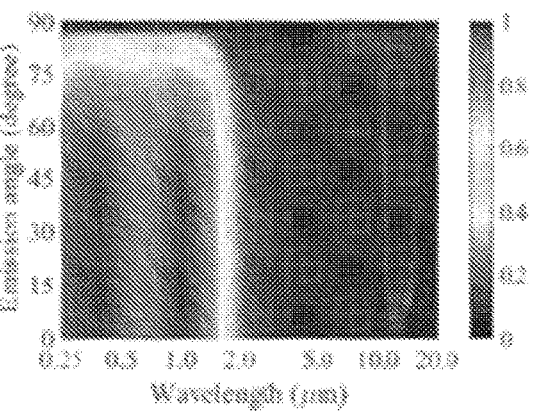
Figure 2D:
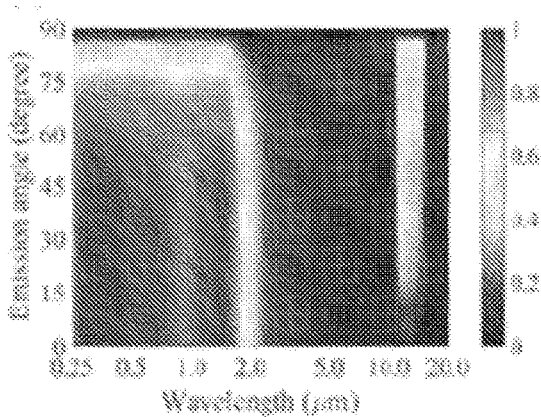
Figure 2E:
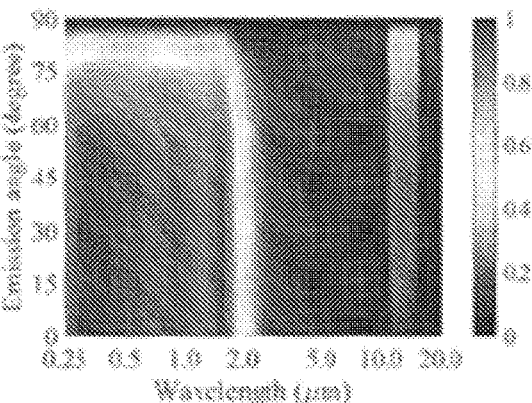
Figure 2F:
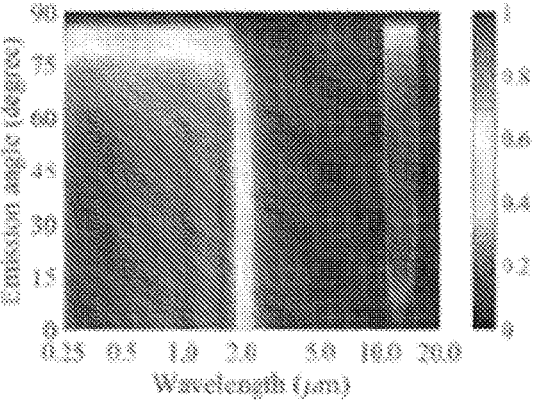

Since Kirchhoff's law states that thermal emissivity equals the optical absorptance for any surface, the thermal emissivity for the nanostructure 100 can be equal to the calculated optical absorptance versus wavelength $\lambda$ and angle of incidence $\theta$ for both TE and TM polarizations of light respectively. In one embodiment, the calculated thermal emissivity versus wavelength and emission angle (as measured from a line normal to the surface of the nanostructure) for different arrangements or configurations of nanostructures 100 is shown in FIGS. 2A-2F. FIG. 2A shows the thermal emissivity of the nanostructure 100 for N=0 (corresponding to FIG. 1A). FIG. 2B shows the thermal emissivity of the nanostructure 100 for N=1 (corresponding to FIG. 1B). FIG. 2C shows the thermal emissivity of the nanostructure 100 for N=2. FIG. 2D shows the thermal emissivity of the nanostructure 100 for N=4. FIG. 2E shows the thermal emissivity of the nanostructure 100 for N=6. FIG. 2F shows the thermal emissivity of the nanostructure 100 for N=8. In the embodiment of FIGS. 2A-2F, the metal layer(s) 106 (for N>0) can be tungsten and have a thickness of 5 nm, the anti-reflective layer 102 and the dielectric layer(s) 108 (for N>0) can be aluminum oxide and have a thickness of 50 nm, and the base metal layer 104 can be tungsten and have a thickness 200 nm, which is thick enough to block light transmission to the substrate 120 in the spectral range of interest. The known optical constants of tungsten metal and aluminum oxide dielectric film can be used for the calculations.

As shown in FIG. 2A, the nanostructure 100 with the single dielectric layer on metal (DLM) structure surface (corresponding to FIG. 1A) can give over 80% emissivity over a wavelength range from 0.3 μm to 0.6 μm for incident angles below 75 degrees. In contrast, as shown in FIG. 2D, a nanostructure 100 with a four bilayer structure gives over 90% thermal emissivity in the wavelength range from 0.25 μm to 1.85 μm. As generally shown in FIGS. 2A-2F, the total thermal emissivity for the nanostructure 100 increases as the number of bilayers increases. In addition, the nanostructure 100 shown in FIG. 2A gives almost zero thermal emissivity at a wavelength of 10 μm at large angles of incidence, while the nanostructure 100 shown in FIG. 2E gives 0.40 thermal emissivity in the same spectral range. FIGS. 2A-2F show that the nanostructures 100 with large numbers of metal-dielectric bilayers 110 have larger thermal emissivity over a wider spectral band than nanostructures 100 having a smaller number of bilayers 110 or no bilayers 110.

The total thermal emission power $P_r$ from the surface of the nanostructure 100 can be obtained by integrating the calculated angular dependent thermal emissivity over all emission angles of a semi-sphere as provided for in equation 9.

$$P_r = \int_0^{2\pi} d\varphi \int_0^{\frac{\pi}{2}} \sin\theta d\theta \int_0^{\infty} \varepsilon(\theta, \lambda) L_{BB}(\lambda, T) d\lambda \tag{9}$$

where $\theta$ is the observation polar angle and $\phi$ is the azimuthal angle. In equation 9, $L_{bb}(\lambda,T)$ is Planck's black body radiation spectrum at equilibrium temperature T as provided for in equation 10.

$$L_{BB}(\lambda, T) = \frac{2hc^2}{\lambda^5} \frac{1}{e^{\frac{hc}{\lambda k_B T}} - 1} \tag{10}$$

where h is Planck's constant, c is the speed of light, $K_B$ is the Boltzmann constant.

The absorbed solar radiation power can be calculated by using the optical absorptance of the surface of the nanostructure 100 and the measured solar irradiance on Earth. Assuming that the solar light radiation is at the normal direction, the absorbed solar radiation power $P_s$ is provided for in equation 11.

$$P_s = \int_0^{\infty} A_0(\lambda) L_{sun}(\lambda) d\lambda \tag{11}$$

where $\lambda$ is the optical wavelength, $A_0(\lambda)$ is the optical absorptance at normal incidence, and $L_{sun}(\lambda)$ is solar irradiance on the surface of the Earth.

Figure 3:
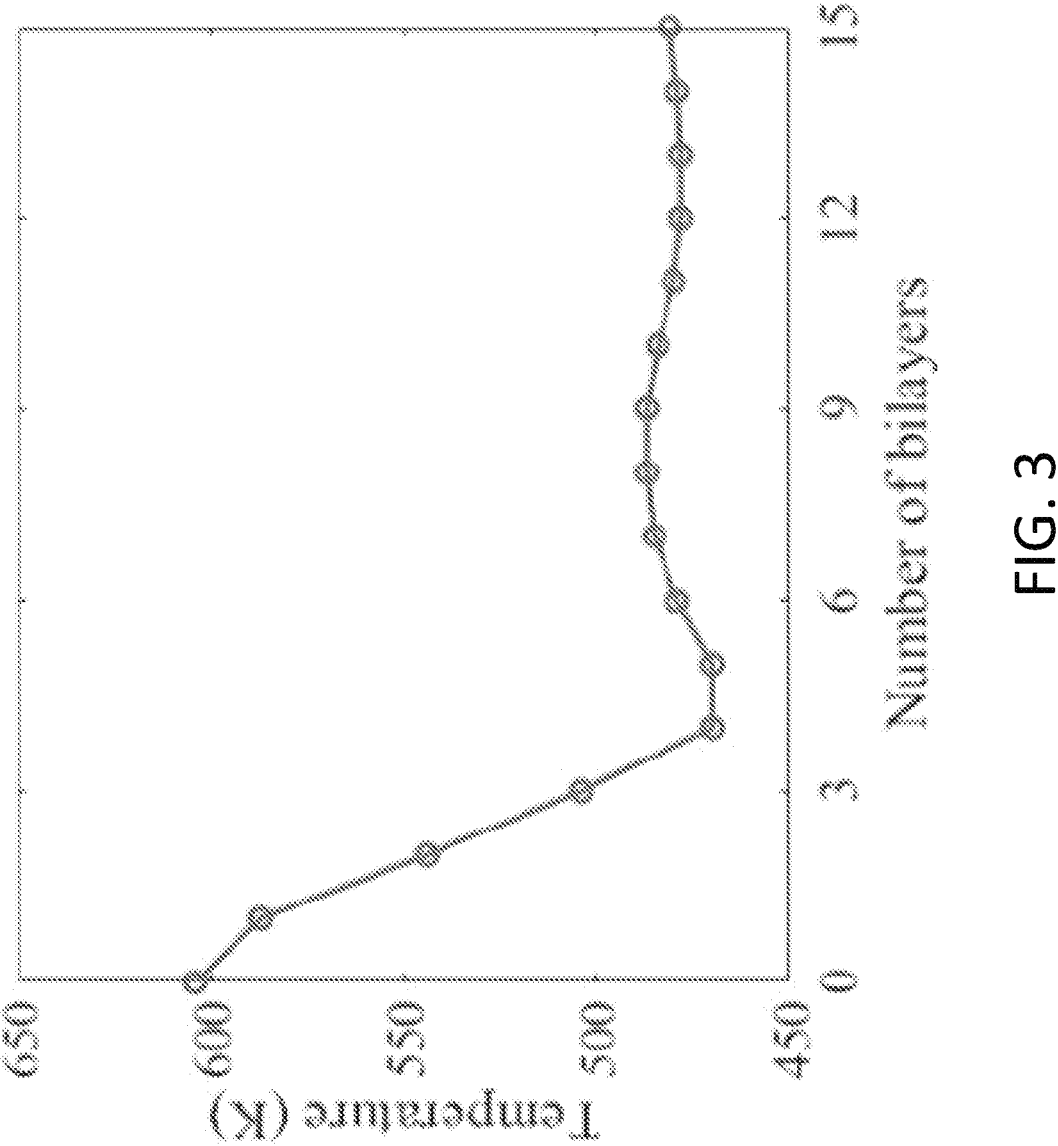
FIG. 3 is a graph showing equilibrium temperatures for different configurations of an embodiment of a metal-dielectric thin film structure.

If the bottom of the nanostructure 100 is completely insulated from the surroundings, then the total absorbed solar power is equal to the total thermal emission power at the equilibrium temperature because of energy conservation. By using the law of energy conservation, the equilibrium temperatures of different configurations of nanostructures 100 (i.e., nanostructures 100 with differing numbers of metal-dielectric bilayers 110) can be calculated as shown in FIG. 3 based, at least partially, on the nanostructure 100 configurations used for FIGS. 2A-2F. As shown in FIG. 3, the highest equilibrium temperature is 604 K for a nanostructure with no bilayers 110 (N=0). A nanostructure 100 with three bilayers 110 (N=3) can have an equilibrium temperature of 504 K, while a nanostructure 100 with six bilayers 110 (N=6) can have an equilibrium temperature of 479 K. Increasing the number of bilayers 110 in the nanostructure 110 can result in a higher optical absorption in the short wavelength region, but can also increase thermal emission in the infrared region and causes a large amount of energy loss. Thus, as seen in FIG. 3, increasing the number of bilayers 110 in the nanostructure 100 cannot be used to increase the equilibrium temperature above the equilibrium temperature for a nanostructure 100 that does not include bilayers 110.

When attempting to obtain a high equilibrium temperature in a nanostructure 100, low thermal emissivity in the long wavelength spectral region can be more critical than high absorptance in the short wavelength region. In that regard, as shown in FIGS. 2A-2F, the nanostructure 100 with the anti-reflective layer 102 on the base metal layer 104 has lower thermal radiation than nanostructures 100 with one or more bilayers 110 in the long wavelength region as well as a narrow absorption band and low optical absorptance in the short wavelength region. Therefore, the nanostructure 100 with the anti-reflective layer 102 on the base metal layer 104 may be used as the structure for achieving the highest equilibrium temperature.

Figure 4A:
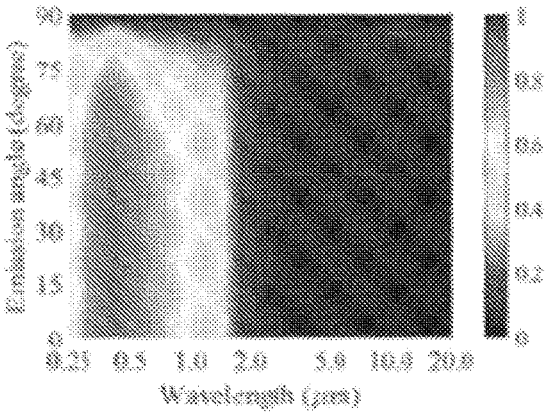
FIGS. 4A-4D are graphs showing thermal emissivity for an embodiment of a metal-dielectric thin film structure having different thicknesses of an anti-reflective layer.
Figure 4B:
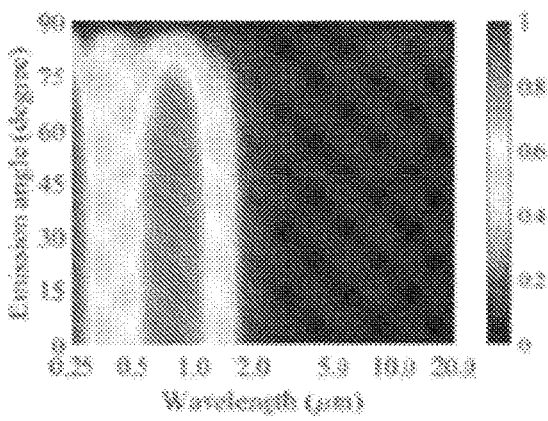
Figure 4C:
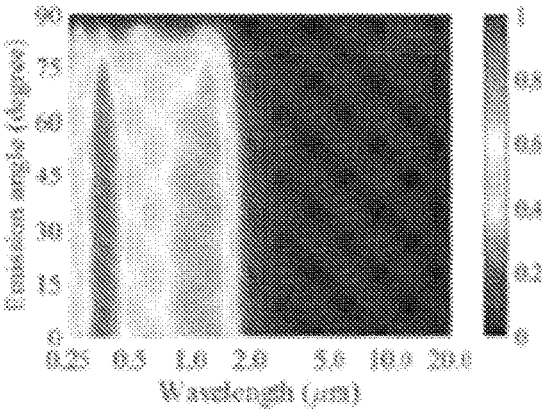
Figure 4D:
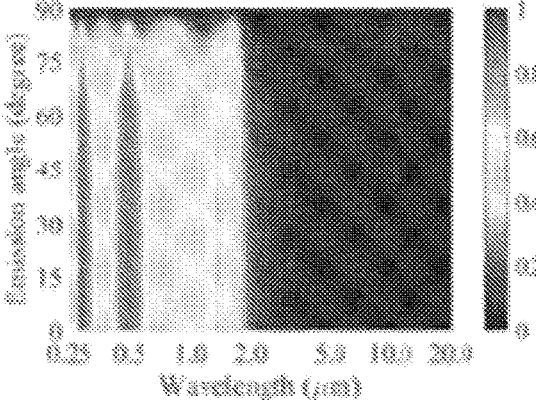

To determine the highest equilibrium temperature for the nanostructure 100 with the anti-reflective layer 102 on the base metal layer 104, the thermal emissivity of the zero-bilayer structure is calculated for different anti-reflective (AR) layer 102 thicknesses. In one embodiment, the calculated thermal emissivity versus wavelength and emission angle for different thickness of the AR layer 102 on the base metal layer 104 is shown in FIGS. 4A-4D. FIG. 4A shows the thermal emissivity of the nanostructure 100 when the AR layer 102 has a thickness of 50 nm. FIG. 4B shows the thermal emissivity of the nanostructure 100 when the AR layer 102 has a thickness of 70 nm. FIG. 4C shows the thermal emissivity of the nanostructure 100 when the AR layer 102 has a thickness of 90 nm. FIG. 4D shows the thermal emissivity of the nanostructure 100 when the AR layer 102 has a thickness of 100 nm. In the embodiment of FIGS. 4A-4D, the base metal layer 104 can be tungsten and have a thickness 200 nm. As shown in FIGS. 4A-4D, increasing the AR layer thickness can result in increased thermal emissivity in the infrared spectral region.

Figure 5:
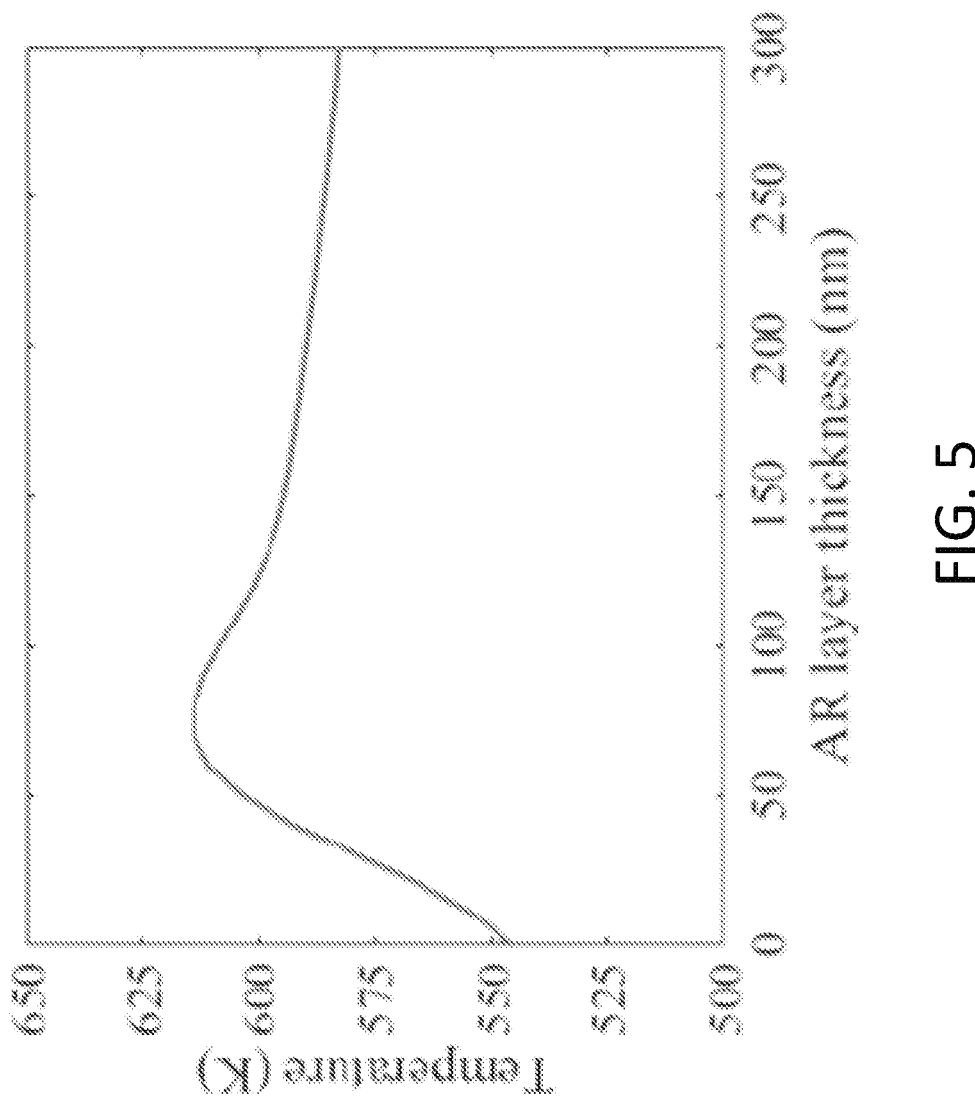
FIG. 5 is a graph showing equilibrium temperatures of an embodiment of a metal-dielectric thin film structure having different thicknesses of an anti-reflective layer.

To optimize the AR layer 102 thickness for high equilibrium temperature, the equilibrium temperature of the zero-bilayer nanostructure 100 with different anti-reflective layer thicknesses can be calculated with the thermal emissivity data obtained by using Kirchhoff's law of thermal radiation. FIG. 5 shows the calculated equilibrium temperature of the zero-bilayer nanostructure 100 versus AR layer thickness. As shown in FIG. 5, the equilibrium temperature increases from 545 K to 614 K as the AR layer thickness is increased from 0 nm to 75 nm. Further increasing the AR layer thickness above 75 nm can result in a decrease in the equilibrium temperature. At the AR layer thickness of 300 nm, the equilibrium temperature decreases to 583 K. Thus, based on FIG. 5, the AR layer thickness for achieving high equilibrium temperature (i.e., 614 K) in the nanostructure 100 is 75 nm.

Figures 6A, 6B, 6C, 6D, 6E, 6F:
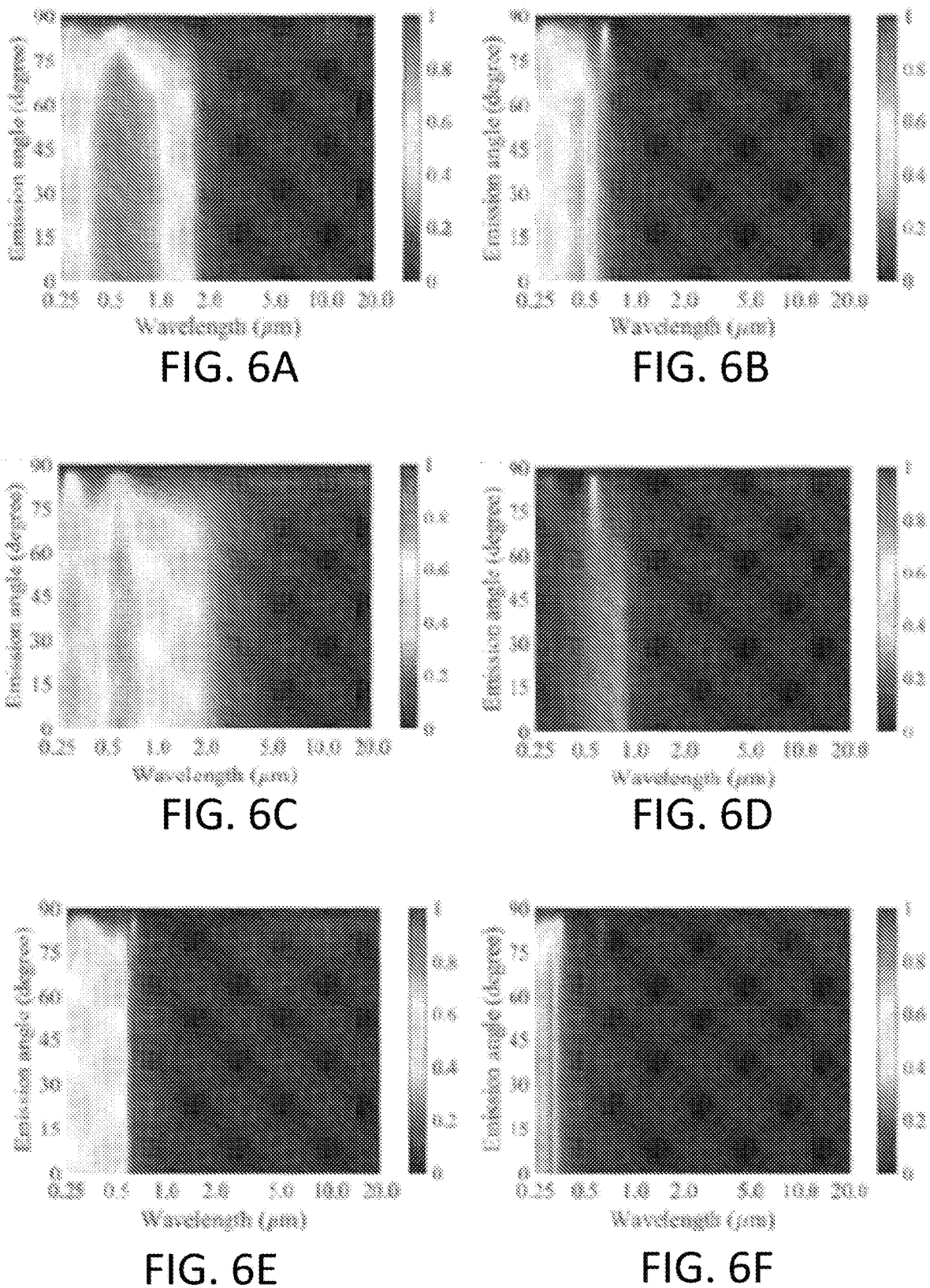
FIGS. 6A-6F are graphs showing thermal emissivity for different configurations of an embodiment of a metal-dielectric thin film structure.

Next, an evaluation is made to determine if changing the metal (from tungsten) in the base metal layer 104 of the nanostructure 100 can increase the equilibrium temperature. In one embodiment, the calculated thermal emissivity versus wavelength and emission angle for different metals in the base metal layer 104 is shown in FIGS. 6A-6F. FIG. 6A shows the thermal emissivity of the nanostructure 100 with a base metal layer 104 of tungsten (W). FIG. 6B shows the thermal emissivity of the nanostructure 100 with a base metal layer 104 of gold (Au). FIG. 6C shows the thermal emissivity of the nanostructure 100 with a base metal layer 104 of chromium (Cr). FIG. 6D shows the thermal emissivity of the nanostructure 100 with a base metal layer 104 of aluminum (Al). FIG. 6E shows the thermal emissivity of the nanostructure 100 with a base metal layer 104 of copper (Cu). FIG. 6F shows the thermal emissivity of the nanostructure 100 with a base metal layer 104 of silver (Ag). In the embodiment of FIGS. 6A-6F, the AR layer 102 can be aluminum oxide and have a thickness of 70 nm and the base metal layer 104 can have a thickness 200 nm. The known optical constants of the metals and the aluminum oxide dielectric film can be used for the calculations. As shown in FIG. 6A, a base metal layer 104 of tungsten can provide the maximum thermal emissivity over the visible-IR spectral range. In contrast, as shown in FIG. 6F, a base metal layer 104 of silver can provide the minimum thermal emissivity over the visible-IR spectral range.

Figure 7:
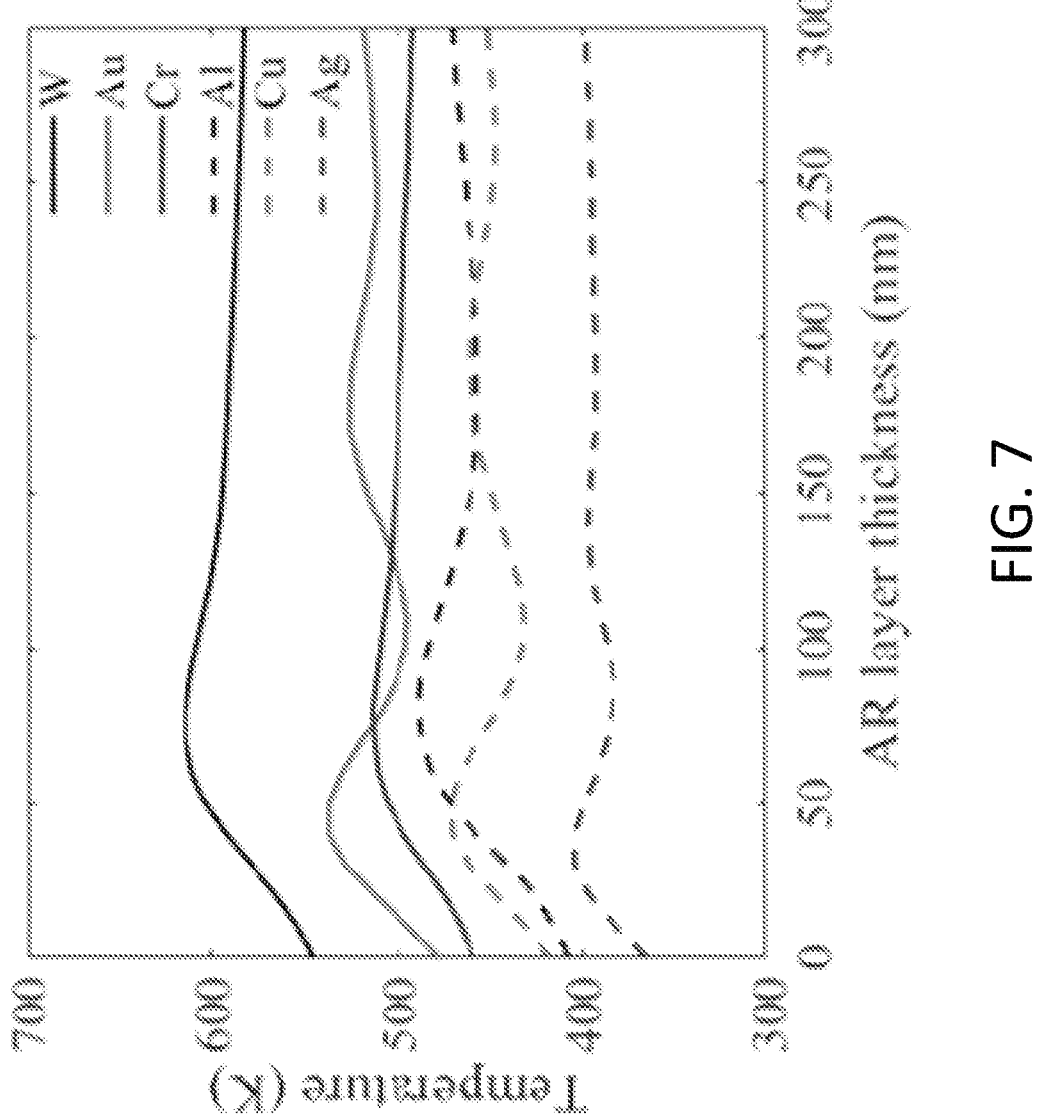
FIG. 7 is a graph showing equilibrium temperature versus AR layer thickness of an embodiment of a metal-dielectric thin film structure having different base metal layers.

After obtaining the emissivity of the AR layer 102 on the base metal layer 104 with six different metals, the equilibrium temperatures of the different nanostructures 100 can be calculated under normal solar optical radiation. The calculated equilibrium temperature versus the AR layer thickness for six different base metal layers 104 is shown in FIG. 7. From FIG. 7, a 75 nm thick AR layer 102 on a thick tungsten base metal layer 104 can produce an equilibrium temperature of 614 K, while a 45 nm thick AR layer 102 on a gold base metal layer 104 can produce an equilibrium temperature of 536 K. The AR layer 102 on a silver base metal layer 104 can produce the lowest equilibrium temperature among the six different metals evaluated. Thus, a nanostructure 100 with tungsten can produce the highest equilibrium temperatures and a nanostructure 100 with silver can produce the lowest equilibrium temperature under direct solar light radiation. In the calculations, it is assumed that there is no thermal energy loss in the substrate 120. However, there can be some thermal conduction energy loss in the substrate 120, which can reduce the equilibrium temperature of the nanostructures 100. To minimize any thermal energy loss from the substrate 120, the substrate 120 can be insulated.

The nanostructure 100 can be used to provide a solar-powered heat source when other types of power are not available (e.g., an outdoor setting such as a forest or mountain region). The nanostructure 100 can be used as a stand-alone heat source or the nanostructure 100 may be incorporated into an item to provide heat for a particular purpose. One or more nanostructures 100 can be heated to the equilibrium temperature with direct solar radiation and then radiate the collected thermal energy to provide heat.

In an embodiment, the nanostructure 100 may be used with a removable thermally insulating cover that can be placed over the anti-reflective layer 102 when the nanostructure 100 is not in use. The insulating cover can be used to enable the nanostructure 100 to be transported if the temperature of the nanostructure 100 is at too high of a temperature for normal handling. In addition, the insulating cover can also be configured to block light so that the nanostructure 100 is not inadvertently heated during transport. When the nanostructure 100 is to be used, a person can remove the cover and place the nanostructure 100 in direct sunlight to begin the process. In other embodiments, the nanostructure(s) 100 may be incorporated into a hinged or foldable configuration to provide thermal insulation and permit transport of the nanostructure(s) 100. In the hinged configuration, a thermally insulating substrate 120 may be used and extend past the base metal layer 104 to provide a type of cover or "case" for the base metal layer 104 (and any layers on the base metal layer 104) when the opposed ends of the nanostructure 100 are brought toward one another.

The heat from the nanostructure(s) 100, once the equilibrium temperature has been reached, can be transferred from the base metal layer 104 to the ambient or other material via one or more of conduction, convection or radiation for applications such as heating (and possibly purifying) a liquid, such as water, or a gas or for cooking food (e.g., eggs). For example, a portion of the substrate 120 may be thermally conductive and have one or more internal passages used for circulating water. The nanostructure(s) 100 can heat the thermally conductive portion of the substrate 120 (and the water flowing through the passages) via conductive heat transfer to heat and possibly purify the water. In another example, the nanostructure(s) 100 may be used to provide heat that can then be used to cook food that is placed directly on the nanostructure 100 (e.g., the anti-reflective layer 102 or a portion of the substrate 120 that is thermally conductive) or to heat a cooking vessel (e.g., a pan) that is placed on the nanostructure 100.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A nanostructure for converting solar energy into thermal energy, comprising:
   an opaque metal layer having a thickness of at least 100 nanometers (nm); and
   an anti-reflective coating formed directly on the first metal layer and positioned such that sunlight enters the nanostructure through the anti-reflective coating and is absorbed by the opaque metal layer after passing through the anti-reflective coating, thereby increasing a temperature of the nanostructure above 400 Kelvin, the anti-reflective coating composed of a dielectric material and having a thickness less than 200 nm.

2. The nanostructure of claim 1, wherein the thickness of the anti-reflective coating is between 20 nm and 100 nm.

3. The nanostructure of claim 1, wherein the opaque metal layer is composed of tungsten.

4. The nanostructure of claim 3, wherein the thickness of the anti-reflective coating is between 20 nm and 50 nm.

5. The nanostructure of claim 1, wherein the opaque metal layer is composed of gold.

6. The nanostructure of claim 5, wherein the thickness of the anti-reflective coating is between 20 nm and 80 nm.

7. The nanostructure of claim 1, wherein the opaque metal layer is composed of chromium.

8. The nanostructure of claim 7, wherein the thickness of the anti-reflective coating is greater than 20 nm.

9. The nanostructure of claim 1, wherein the dielectric material is selected from the group consisting of aluminum oxide, silicon dioxide, yttrium oxide or magnesium fluoride.

10. The nanostructure of claim 9, wherein the dielectric material is aluminum oxide.

11. The nanostructure of claim 1, wherein the opaque metal layer has a thickness of 200 nm.

12. A system for converting solar energy into thermal energy, the system comprising:
   a substrate;
   an opaque metal layer formed on the substrate, the opaque metal layer having a thickness of at least 100 nanometers (nm); and
   an anti-reflective layer formed directly on the opaque metal layer, the anti-reflective layer composed of a dielectric material and having a thickness less than 200 nm, the anti-reflective layer being positioned to permit solar energy to enter the system through the anti-reflective layer and be absorbed by the opaque metal layer after passing through the anti-reflective layer such that the opaque metal layer reaches an equilibrium temperature above 400 Kelvin (K).

13. The system of claim 12, wherein the thickness of the anti-reflective coating is between 20 nm and 100 nm.

14. The system of claim 12, wherein the opaque metal layer is composed of tungsten and reaches an equilibrium temperature above 500 K.

15. The system of claim 12, wherein the opaque metal layer is composed of one of tungsten, chromium, silver, copper, aluminum, gold or a metal alloy.

16. The system of claim 12, wherein the substrate is configured to heat a liquid, a gas or food placed into contact with the substrate.

17. The system of claim 12, wherein the dielectric material is aluminum oxide.

* * * * *